Figure 1:
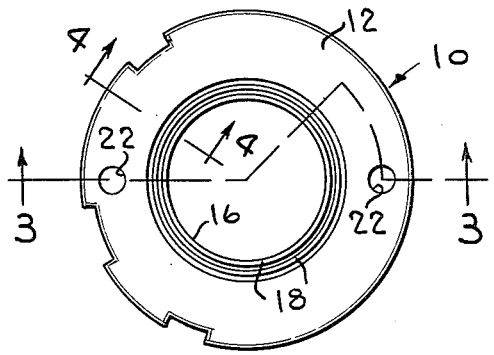

INVENTORS
HOWARD R. CHAPIN
ROBERT J. FUCHS
BY
ATTORNEY

United States Patent Office 3,212,353
Patented Oct. 19, 1965

3,212,353
MOLDED CAM ASSEMBLY
Howard R. Chapin, Park Ridge, and Robert J. Fuchs, Chicago, Ill., assignors to Controls Company of America, Schiller Park, Ill., a corporation of Delaware
Filed May 31, 1961, Ser. No. 113,891
6 Claims. (Cl. 74—567)

This invention relates to a cam arbor structure for use in timers and particularly to the interlocking of the timer cams by an injection molding process.

In timers or multi-circuit rotary switches a cam arbor is used to control the switches in the circuits. These arbors are generally assembled by press fitting a number of cams on a central arbor. The cams must be accurately and rigidly related to one another both axially and angularly in order to provide an accurate switching relation for the circuits. This type of assembling procedure has resulted in a substantial number of rejects because of misalignment, breakage and looseness in the cams.

The primary object of this invention is to provide a method for accurately and permanently locking a series of cams in a predetermined relationship.

This object is accomplished by molding a number of cam discs each having a central aperture with a number of members projecting inwardly from the periphery of the aperture. The discs are stacked in a predetermined relationship so that the cam surfaces on the discs are properly aligned. The aperture is then filled with a thermoplastic material and allowed to cool until the thermoplastic sets within the aperture. Once the thermoplastic has set within the cam discs, the resulting cam and arbor assembly will be positively interlocked.

Figure 5:
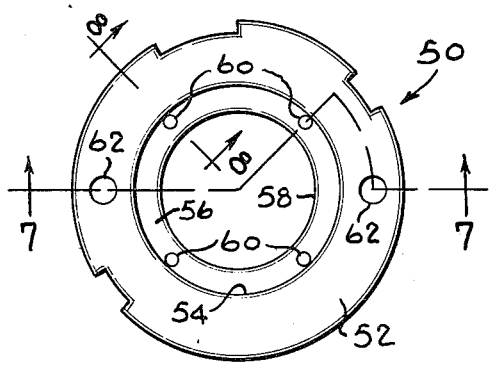
Figure 2:
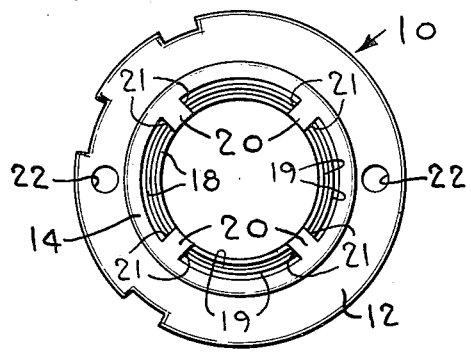
Figure 6:
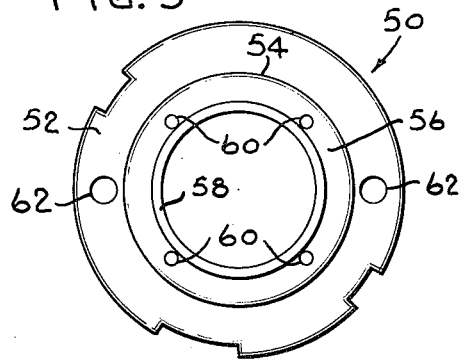
Figure 3:
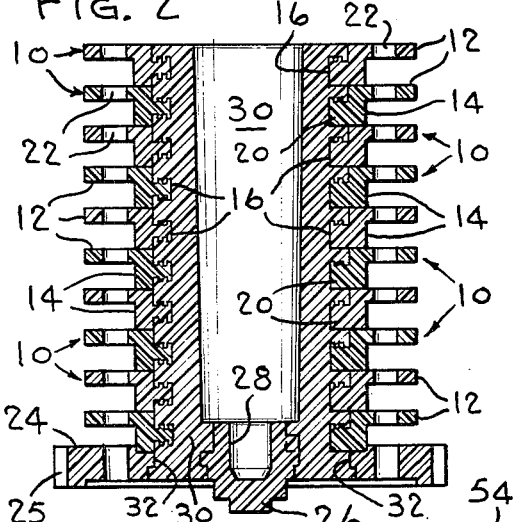
Figure 7:
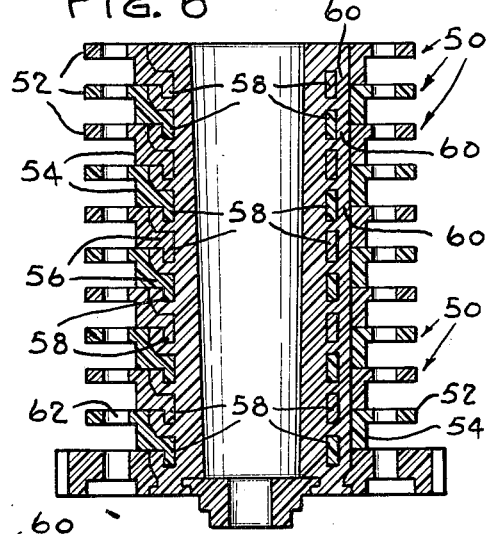
Figure 4:
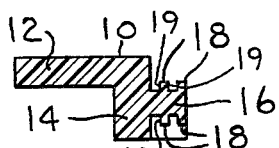
Figure 8:
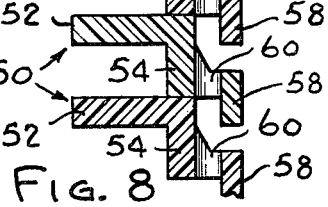

Other objects and advantages will be pointed out in, or be apparent from, the specification and claims, as will obvious modifications of the two embodiments shown in the drawings, in which:

FIG. 1 is a top view of one of the cam discs;
FIG. 2 is a bottom view of the cam disc;
FIG. 3 is a view taken on line 3—3 of FIG. 1 showing the assembled cam arbor;
FIG. 4 is taken on line 4—4 of FIG. 1 showing the internal flange;
FIG. 5 is a top view of a second type of cam disc;
FIG. 6 is a bottom view of the modified cam disc;
FIG. 7 is a view taken on line 7—7 of FIG. 5 showing the assembled cam arbor; and
FIG. 8 is a view partly in section of the cam disc arrangement.

Referring to the drawings, particularly FIGS. 1 and 2, each molded cam disc 10 is shown having a flat outer flange 12, the periphery of which is a cam surface for controlling the programs of operation, and a cylindrical central section 14 having an internal flange 16. A number of annular ridges 18 having outwardly facing axially extending surfaces 19 (FIG. 4) are provided on the top and bottom surfaces of the internal flange with a number of radially disposed axial projections 20 having radially extending surfaces 21 on the underside of the internal flange. Diametrically opposite holes 22 are provided in the outer flange for aligning the cam discs during the molding operation.

The cam discs are assembled by mounting the cams on a fixture having a center core which fits into the cylindrical section of the discs and a pair of rods to align holes 22. A disc 24 having a central bearing 26 and an outer peripheral ratchet 25 is mounted on top of the stack with the center core being aligned with aperture 28. The cam discs are subjected to a slight pressure and thermoplastic material 30 injected into the space between the center core and the cylindrical section through apertures 32 in the ratchet disc.

The thermoplastic material will flow into the spaces between the internal flanges on the cam discs and the space between the ridges on the internal flanges. This material will shrink radially against the axially extending surfaces 19, axially against the surfaces lying in planes normal to the axis, and will shrink against the radial surfaces 21 during cooling to bind the stack together and prevent any axial or angular displacement of the discs. After the thermoplastic material has set, the fixture is removed. The cam arbor produced by this process is a very rigid structure that cannot be moved either axially or angularly. The thermoplastic material mechanically interlocks the cam discs, providing the rigid structure and doesn't rely on the adhesive quality of the material which may or may not exist.

In the modification shown in FIGS. 5–8, each cam disc 50 is provided with an outer flange 52, a cylindrical section 54 and an internal flange 56 supporting an axially aligned section 58. A number of apertures 60 are provided in the internal flange and diametrically opposite holes 62 in the outer flange for aligning the cam discs during molding.

The cam discs are mounted on a fixture as described above and thermoplastic material injected into the center of the cam discs. The thermoplastic material will flow into the spaces between the internal flanges and will fill apertures 60. As the thermoplastic material starts to cool, it tends to shrink away from the internal surfaces of the cylindrical section, but section 58 provides a surface against which the thermoplastic may shrink and in combination with aperture 60 and the surfaces normal to the axis prevents any axial or angular movement between the cam discs.

In both of the above structures, the entire center cavity could be filled with thermoplastic material if desired to form a solid cam arbor or core as above. In either instance, the cam discs will be rigidly interlocked.

It will be seen that both embodiments utilize a generally axially extending outwardly facing surface (19, 58) in combination with a generally radially disposed surface at least a portion of which is axially extending (21 and the sides of holes 60) to provide surfaces against which the plastic can shrink to positively hold the cams axially and angularly. In addition both forms have surfaces normal to the axis and against which the plastic shrinks to bind the stack together. Although only two embodiments of the present invention have been illustrated and described, it will be apparent to those skilled in the art that various changes and modifications may be made therein without departing from the spirit of the invention or from the scope of the appended claims.

We claim:

1. A cam assembly for a sequence timer comprising, a number of cam discs each having a central aperture surrounded by an inwardly directed flange, said cam discs being stacked to form a cavity with spaces between the flanges, and a plastic material surrounding and filling the spaces between the flanges whereby said cam discs are held in a rigid structure.

2. A cam assembly according to claim 1 wherein said flanges each include an aperture for the passage of the plastic material to angularly interlock the discs.

3. A cam assembly according to claim 2 wherein said flanges each include an axially projecting member which is embedded within the plastic material so that the plastic material mechanically interlocks the discs from axial and radial displacement.

4. A cam assembly for a sequence timer comprising, a number of cam discs each having a central aperture and an internal surface formed to provide a generally axially extending outwardly facing surface and a generally radially disposed surface at least a portion of which is axially extending, said cam discs being stacked to form a cylindrical cavity, and a plastic material filling said cavity and surrounding said surfaces so that the discs are axially and angularly interlocked.

5. A cam assembly for a sequence timer comprising, a number of cam discs each having a central aperture and an internal surface formed to provide a generally axially extending outwardly facing surface, said cam discs arranged to form a cylindrical cavity, and a rigid filler material filling said cavity and surrounding said internal surfaces so that the discs are interlocked with said filler material.

6. The cam assembly of claim 5 wherein each of said cam discs include an inner flange defining said central aperture and wherein said internal surfaces are provided on said flanges, said flanges being arranged in relative spaced relation when said cams are stacked so that said filler material surrounds said flanges and said internal surfaces.

References Cited by the Examiner
UNITED STATES PATENTS

| | | |
|---|---|---|
| 1,764,662 | 6/30 | Tomlin. |
| 2,290,249 | 7/42 | Piperoux. |
| 2,379,771 | 7/45 | Weidauer et al. _____ 74—567 |
| 2,446,281 | 8/48 | Harding. |
| 2,455,708 | 12/48 | Sherwin. |
| 2,889,419 | 6/59 | Miller et al. _____ 200—38.2 |
| 2,932,983 | 4/60 | Laviana et al. _____ 74—567 |
| 2,956,848 | 10/60 | St. Clair. |
| 3,001,418 | 9/61 | Nectoux _____ 200—38 |
| 3,046,810 | 7/62 | McCouch _____ 74—567 X |
| 3,132,412 | 5/64 | Kreissig _____ 264—274 |

BROUGHTON G. DURHAM, *Primary Examiner.*